US006686848B1

(12) United States Patent
Morikawa

(10) Patent No.: US 6,686,848 B1
(45) Date of Patent: Feb. 3, 2004

(54) REMOTE CONTROL APPARATUS AND ELECTRONIC APPLIANCE CONTROLLABLE BY SAME

(75) Inventor: Shigekazu Morikawa, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/492,278

(22) Filed: Jan. 27, 2000

(30) Foreign Application Priority Data

Jan. 26, 1999 (JP) .......................................... 11-017509

(51) Int. Cl.[7] ........................ G05B 19/02; H04M 11/04; G04F 8/00; G04C 11/02

(52) U.S. Cl. ........................... 340/825.22; 340/310.01; 368/1; 368/9; 368/47

(58) Field of Search ........................... 340/825.22, 825, 340/825.37, 825.98, 825.24, 825.69, 310.01, 3.41; 370/282, 429, 360; 709/237, 208; 348/211; 368/9, 1, 47

(56) References Cited

U.S. PATENT DOCUMENTS 4,005,266 A * 1/1977 Lehr et al. .................. 375/343
4,091,422 A * 5/1978 Amster ....................... 348/211
4,279,012 A * 7/1981 Beckedorff et al. ....... 307/141.4
4,728,949 A * 3/1988 Platte et al. ........... 340/825.37
4,855,730 A * 8/1989 Venners et al. ........ 340/825.24
5,072,247 A * 12/1991 Bovee ........................ 396/59
5,276,659 A * 1/1994 Kotaki ........................ 368/10
5,600,711 A * 2/1997 Yuen .......................... 348/734
5,721,830 A * 2/1998 Yeh et al. ................... 709/237
5,805,530 A * 9/1998 Youngberg ................... 368/47
5,815,086 A * 9/1998 Ivie et al. ..................... 307/38

FOREIGN PATENT DOCUMENTS

JP 04-334216 11/1992
JP 04-334217 11/1992
JP 05-314030 11/1993
JP 06-252983 9/1994

* cited by examiner

*Primary Examiner*—Brian Zimmerman
*Assistant Examiner*—Clara Yang
(74) *Attorney, Agent, or Firm*—Armstrong, Kratz, Quintos, Hanson & Brooks, LLP

(57) ABSTRACT

A remote control apparatus includes various operation keys and is connected to a plurality of electronic appliances through buses. If a timepiece reset mode is set on a side of the remote control apparatus and then a desired electronic appliance is selected, a protocol is established between the remote control apparatus and the desired electronic appliance. A command key for reset command input is activated after establishing a protocol. If a command key is operated, a reset command for the timepiece is transmitted to the desired electronic appliance to thereby reset a timepiece circuit provided in the desired electronic appliance. Because the protocol has been established at a time that the command key is operated, the timepiece circuit is reset immediately after operating the command key.

4 Claims, 17 Drawing Sheets

(A)

(B)

REMOTE CONTROL APPARATUS AND ELECTRONIC APPLIANCE CONTROLLABLE BY SAME

BACKGROUND OF THE INVENTION

1. Field of the Invention

This invention relates to a remote control apparatus and electronic appliance controllable by the same and, more particularly, to a remote control apparatus applicable to a monitor camera system to be used in casinos or buildings and an electronic appliance controllable by the same.

2. Description of the Prior Art

In the conventional remote control apparatuses of this kind, a protocol has to be first established for an electronic appliance in order to output commands to the electronic appliance. Due to this, it takes a time of approximately 500 milliseconds, from an input of a command by an operator, to actually input a command to the electronic appliance.

Such delay poses a problem particularly when adjusting a timepiece built in the electronic appliance. That is, where for example a timepiece of 3 minutes too fast is reset at noon (12:00:00) of day, the timepiece thus reset will be too late by 0.5 second with respect to the actual time.

SUMMARY OF THE INVENTION

It is therefore a primary object of the present invention to provide a remote control apparatus that eliminates a deviation between a time that a reset command is inputted to a timepiece and an actually reset time of the timepiece.

Another object of the invention is to provide an electronic appliance that eliminates a deviation between a time that reset command is inputted to a timepiece and an actually reset time of the timepiece.

In accordance with the present invention, a remote control apparatus to remotely control an electronic appliance having a timepiece, comprises: a first instruction key for instructing to establish a state of connection to the electronic appliance; a second instruction key for instructing to reset the timepiece; an establisher for establishing the state of connection to the electronic appliance in response to an instruction by the first instruction key; an activator for activating the second instruction key after establishing the state of connection; and a first transmitter for transmitting a reset command to the electronic appliance in response to an instruction by the second instruction key.

If operating the first instruction key for instructing to establish a state of connection to an electronic appliance, the establisher establishes a state of connection to an electronic appliance. The second key for instructing timepiece reset is activated by the activator after establishing a connection state. If the second instruction key is operated, the first transmitter transmits a reset command to the electronic appliance. In this manner, the reset command is transmitted to the electronic appliance in response to an operation of the second instruction key activated after establishing the connection state. Consequently, the timepiece provided on the electronic appliance is immediately reset in response to the reset command. As a result, it is possible to eliminate a deviation between a time of inputting a timepiece reset command and a time of actually resetting the timepiece.

In one embodiment of the invention, the electronic appliance exists in plurality of number, and the first instruction key includes a select key and a connection state establishing key. If the select key is selected, a desired electronic appliance is selected from among a plurality of electronic appliance. If the connection state establishing key is operated, the desired electronic appliance is instructed to establish the connection state.

In another embodiment of the invention, maintaining commands for maintaining the state of connection are repeatedly transmitted to the electronic appliance. Preferably, the electronic appliance cancels the state of connection when a state of not given a command continues for a predetermined time period, and the second transmitter transmitting the maintaining commands at a shorter interval than the predetermined time period.

In accordance with the present invention, an electronic appliance to be remotely controlled by a controller and having a timepiece, comprises: a first receiver for receiving an instruction to establish a state of connection to the controller; a counter for starting count of a time in response to the establishing instruction; an establisher for establishing the state of connection in response to the establishing instruction; a second receiver for receiving a reset command for the timepiece after establishing the state of connection; a resetter for resetting the timepiece in response to the reset command; and a corrector for correcting by a count value of the counter a time of the timepiece reset by the resetter.

If the first receiver receives an instruction to establish a state of connection to the controller, the counter starts to count a time and the establisher establishes a state of connection to the controller. The second receiver after establishing a connection state receives a command to reset the timepiece. The resetter resets the timepiece in response to the reset command, while the corrector corrects by a counter count value a time of the timepiece reset by the resetter. The time required to establish a connection state is measured by the counter so that the time of the timepiece can be corrected by the counter count value. Therefore, it is possible to eliminate a deviation of between a time a timepiece reset command is inputted and a time that the timepiece is actually reset.

In one embodiment of the invention, the corrector includes a detector to detect a count value of the counter and an adder to add the count value detected by the detector to the time.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
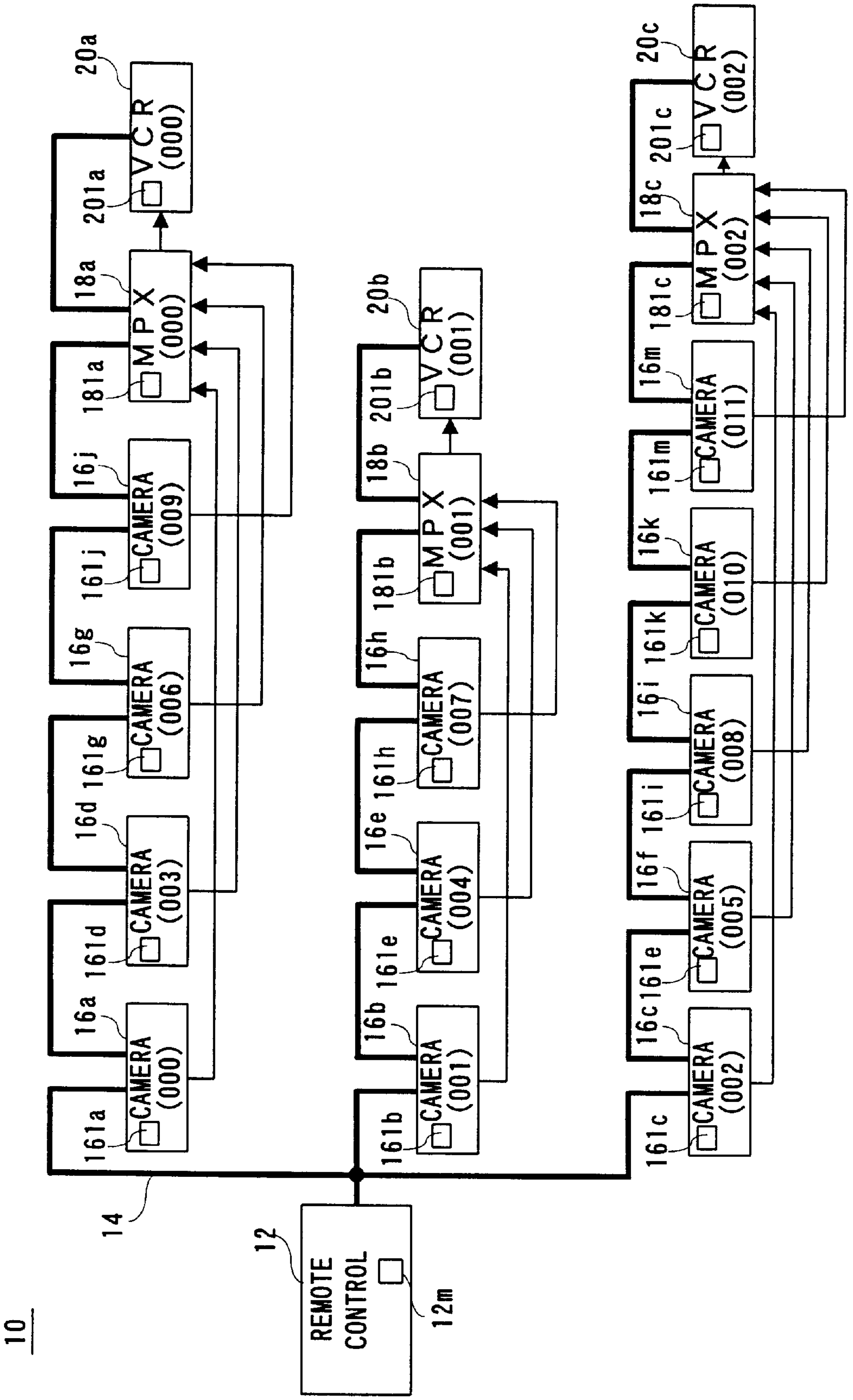
FIG. 1 is a block diagram showing one embodiment of the present invention.

Referring to FIG. 1, a monitor camera system 10 of this embodiment includes a remote control apparatus (controller) 12. The controller 12 is connected with a plurality of cameras 16*a*–16*m*, multiplexers 18*a*–18*c* and time lapse VCRs 20*a*–20*c* through buses 14 for enabling balanced transmission according to the RS-485 rating. These cameras 16*a*–16*m*, multiplexers 18*a*–18*c* and time lapse VCRs 20*a*–20*c* are controlled by the controller 12.

The cameras 16*a*–16*m* have respective timepiece circuits 161*a*–161*m*, the multiplexers 18*a*–18*c* have respective time circuits 181*a*–181*c*, and the time lapse VCRs 20*a*–20*c* have respective timepiece circuits 201*a*–201*c*.

The cameras 16*a*, 16*d*, 16*g* and 16*j* output respective video signals to be inputted to the multiplexer 18*a* where the video signals are subjected to time-division multiplex by the multiplexer 18*a*. The time-division-multiplexed video signal is then recorded on a not-shown video tape by the time lapse VCR 20*a*. The cameras 16*b*, 16*e* and 16*h* have respective outputs to be time-division multiplexed by the multiplexer 18*b*. The multiplexer 18*b* has an output to be recorded on a video tape by the time lapse VCR 20*b*. The cameras 16*c*, 16*f*, 16*i*, 16*k* and 16*m* have respective outputs to be time-division multiplexed by the multiplexer 18*c*. The multiplexer 18*c* has an output to be recorded on a video tape.

In this maner, the video signals due to shooting by the cameras 16*a*–16*m* are recorded by a predetermined time lapse VCR in an intermittent fashion.

The cameras 16*a*–16*m* are assigned with respective 8-bit data “00000000”–“00001011” representing addresses “000”–“011”. The multiplexers 18*a*–18*c* are assigned with respective 8-bit data “00000000”–“00000010” representing addresses “000”–“002”. The VCRs 20*a*–20*c* are assigned with respective 8-bit data “00000000”–“00000010” representing addresses “000”–“002”. Meanwhile, the cameras 16*a*–16*m* are assigned with a shared category code “0100”, the multiplexers 18*a*–18*c* are assigned with a shared category code “0010”, and VCRs 20*a*–20*c* are assigned with a shared category code “0011”. The controller 12 is also assigned with 8-bit data “00000000” representing an address “000” as well as a category code “0001”.

Figure 2:
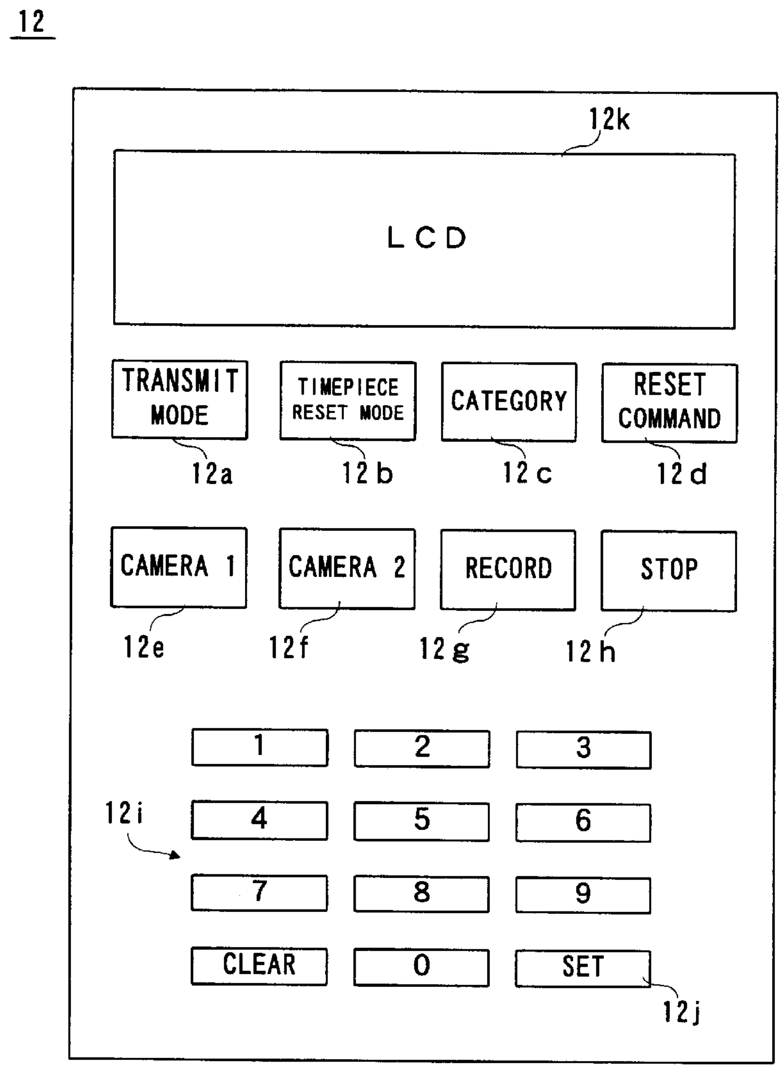
FIG. 2 is an illustrative view showing an operation panel of a remote control apparatus to be applied to the FIG. 1 embodiment.
Figure 3:
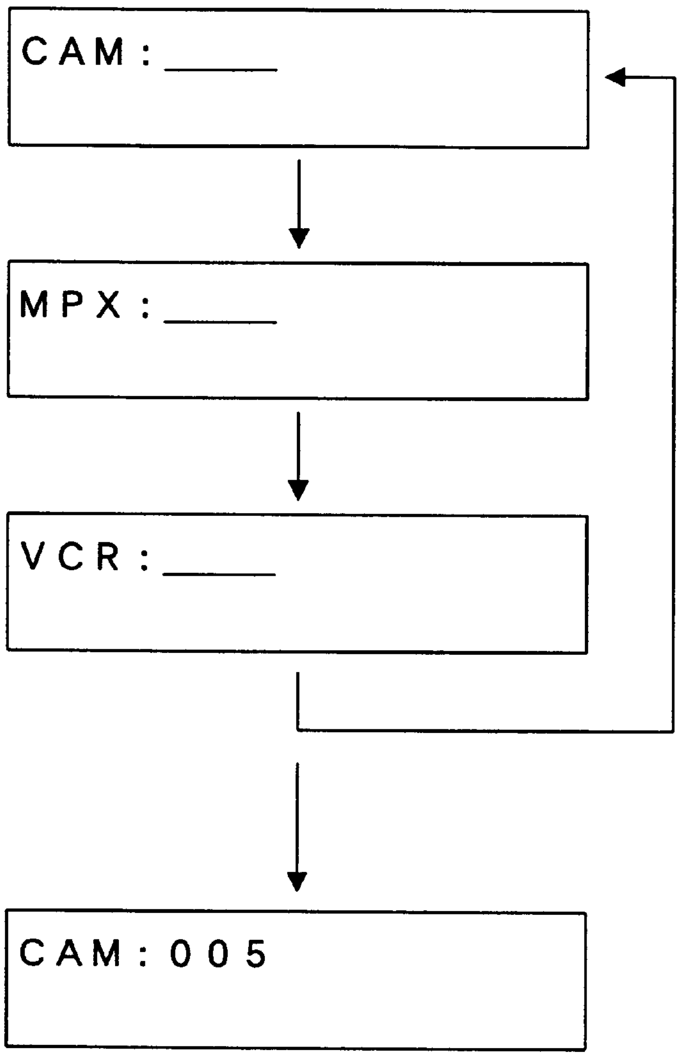
FIG. 3 is an illustrative view showing characters displayed on an LCD of the FIG. 2 embodiment.

Referring to FIG. 2, the controller 12 has thereon various keys 12*a*–12*j* as well as an LCD 12*k*. If an operator presses a TRANSMIT MODE key 12*a*, a normal transmission mode is set. At this time, “CAM:” as shown in FIG. 3 is displayed on the LCD 12*k*. The category on display can be changed in the order of “CAM”→“MPX”→“VCR”→“CAM” each time a category key 12*c* is pressed. The operation of a ten key 12*i* provides address display at an address input block. For example, if an address “005” is inputted in a state that a category “CAM” is being displayed, “CAM: 005” will be displayed on the LCD 12*k*. In a state that a desired category and address are being displayed on the LCD 12*k*, the pressing of a SET key 12*j* establishes a transmission destination. In the example of FIG. 3, the camera 16*f* is established as an appliance of a transmission destination.

After establishing a destination appliance, if any of the command keys 12*e*–12*h* is operated, a protocol is established between the controller 12 and the destination appliance, followed by transmitting a desired command. For example, if the command key 12*e* is pressed when the camera 16*f* is a destination appliance, a camera mode 1 (e.g. a night-time taking mode) is set in the camera 16*f* through a protocol establishing process for the camera 16*f*. Also, if the command key 12*g* is operated when the VCR 20*b* is a destination appliance, a record command is given to the VCR 20*b* through a similar protocol establishing process. Thus, the VCR 20*b* will start to record video signals in response to a record command.

On the other hand, if a TIMEPIECE RESET MODE key 12*b* is pressed, a timepiece reset mode is set up. In also the timepiece reset mode, a destination appliance is established through a similar key operation to the above way. That is, a destination appliance can be established by designating a desired category by the CATEGORY key 12*c* and a desired address by the ten key 12*i* and then pressing the SET key 12*j*. In the timepiece reset mode, however, a protocol establishment process for an established appliance is started in response to operation of the SET key 12*j*. The RESET COMMAND key 12*d* is activated after establishing a protocol. The operation of RESET COMMAND key 12*d* provides a reset command to the established appliance. The timepiece circuit is reset in response to the reset command.

Figure 4:
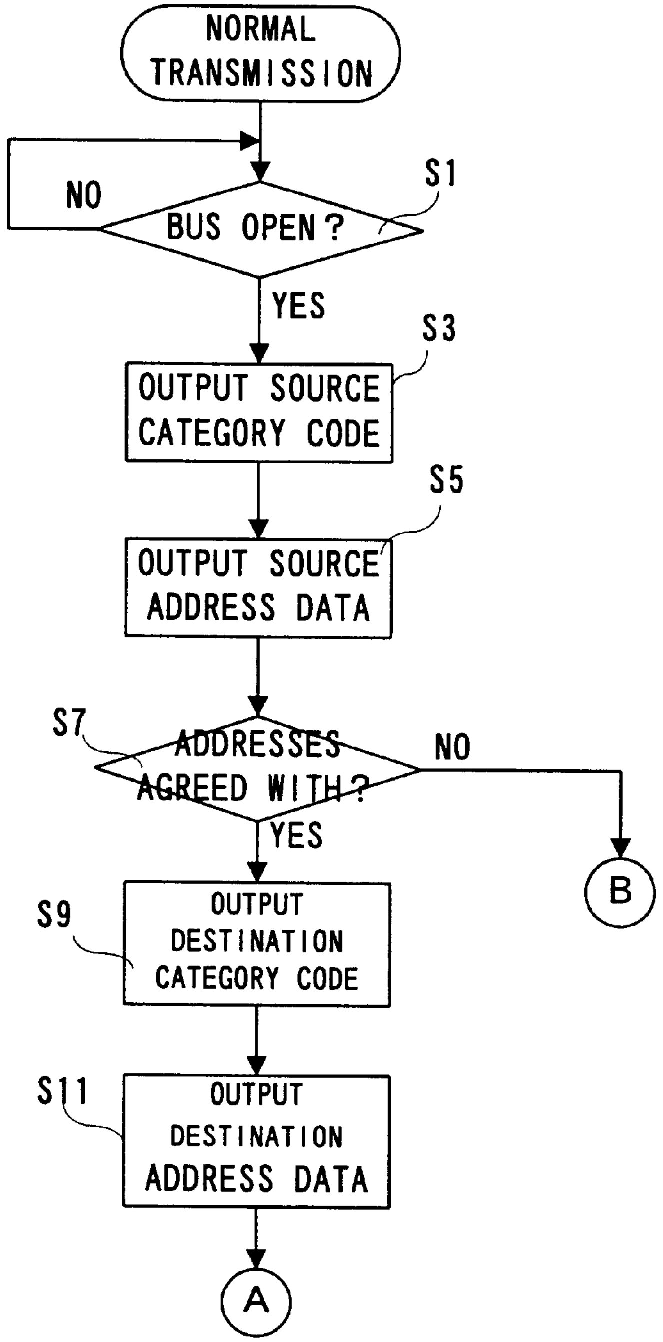
FIG. 4 is a flowchart showing a part of operation of a remote control apparatus applied to the FIG. 1 embodiment.
Figure 5:
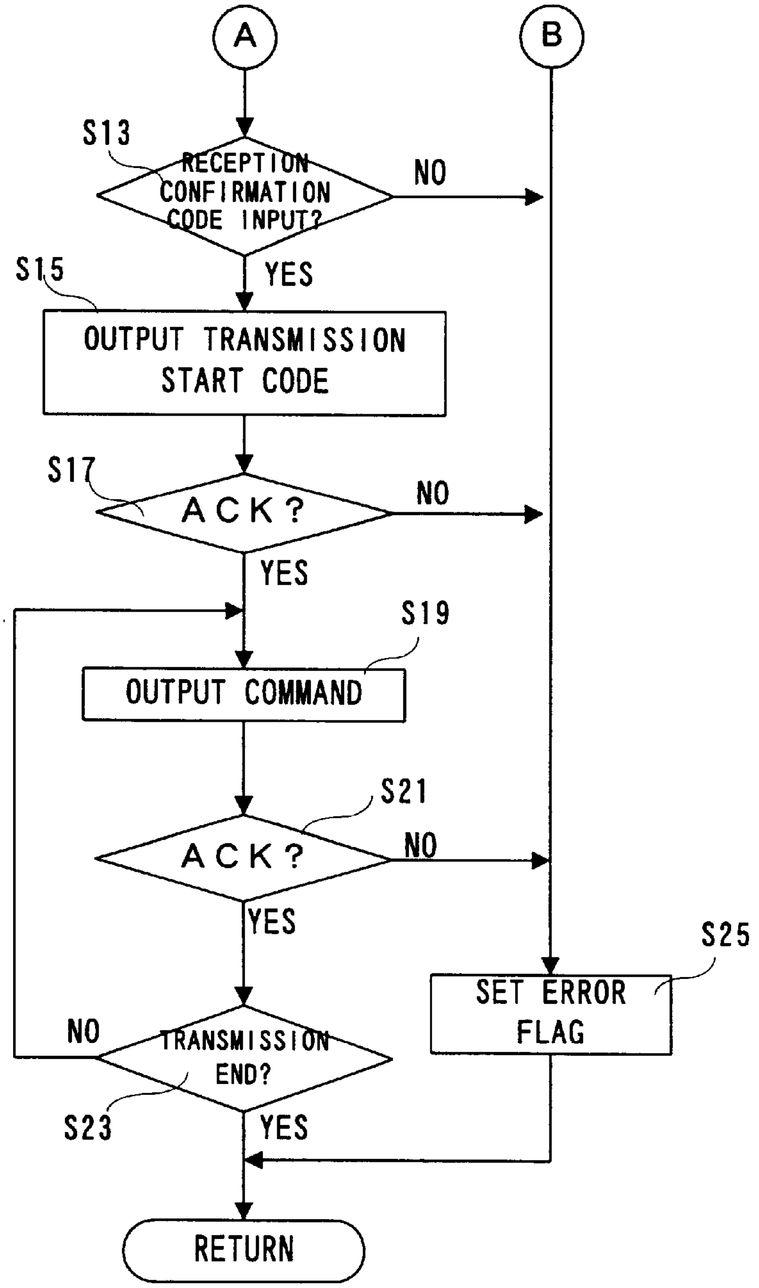
FIG. 5 is a flowchart showing another part of the operation of the remote control apparatus applied to the FIG. 1 embodiment.

When a normal transmission mode is selected, the controller 12 processes a flowchart shown in FIG. 4 and FIG. 5 in response to operation of any one of the command keys 12*e*–12*h*.

The controller 12 first determines in step Si whether the bus 14 is released open or not. If “YES”, in steps S3 and S5 outputted are a transmission-source category code and address data. Because the controller 12 has a category code “0001” and an address “000”, in step S3 a category code “0001” is outputted and in step S5 corresponding 8-bit data “00000000” to the address “000” is outputted.

The output category code and address data are returned to the controller 12. The controller 12 in step S7 determines whether the address assigned thereto agrees with the address indicated by the input data or not. If the both addresses not in agreement with each other, occurrence of error is determined. Accordingly, an error flag 12*m* set process is made in step S25, and the process returns to the not-sown main routine. On the other hand, if the both addresses agree with each other, in step S7 is determined "YES" or no abnormality, and then in steps S9 and S11 outputted are a destination category code and address data. For example, where the transmission destination is the camera 16*g*, in step S9 a category code "0100" is outputted followed by outputting in step S11 address data "00000110".

In step S13 it is determined whether a reception confirmation code has been inputted from the transmission destination or not. If a reception confirmation code has not been inputted in a predetermined time, "NO" is determined in step S13 and the process advances to step S25. On the other hand, if a reception confirmation code has been inputted in a predetermined time, in step S13 "YES" is determined and in step S15 a transmission start code is outputted to the transmission destination. In step S17 it is determined whether "ACK" has been inputted from the transmission destination or not. If "ACK" has not been inputted in a predetermined time, "NO" is also determined herein. If "ACK" has been inputted in a predetermined time, "YES" is determined. When "NO", the process advances to step S25 while if "YES" a command is outputted in step S19.

In step S21 is determined whether "ACK" has been inputted again or not. If "NO" here, in step S25 an error flag 12 12*m* is set up and the process returns to the main routine. However, If "YES", it is determined in step S23 whether command transmission has been ended or not. If "NO", the process returns to step S19 while if "YES" the process returns to the main routine. In this manner, a desired apparatus is controlled in an independent fashion.

Figure 6:
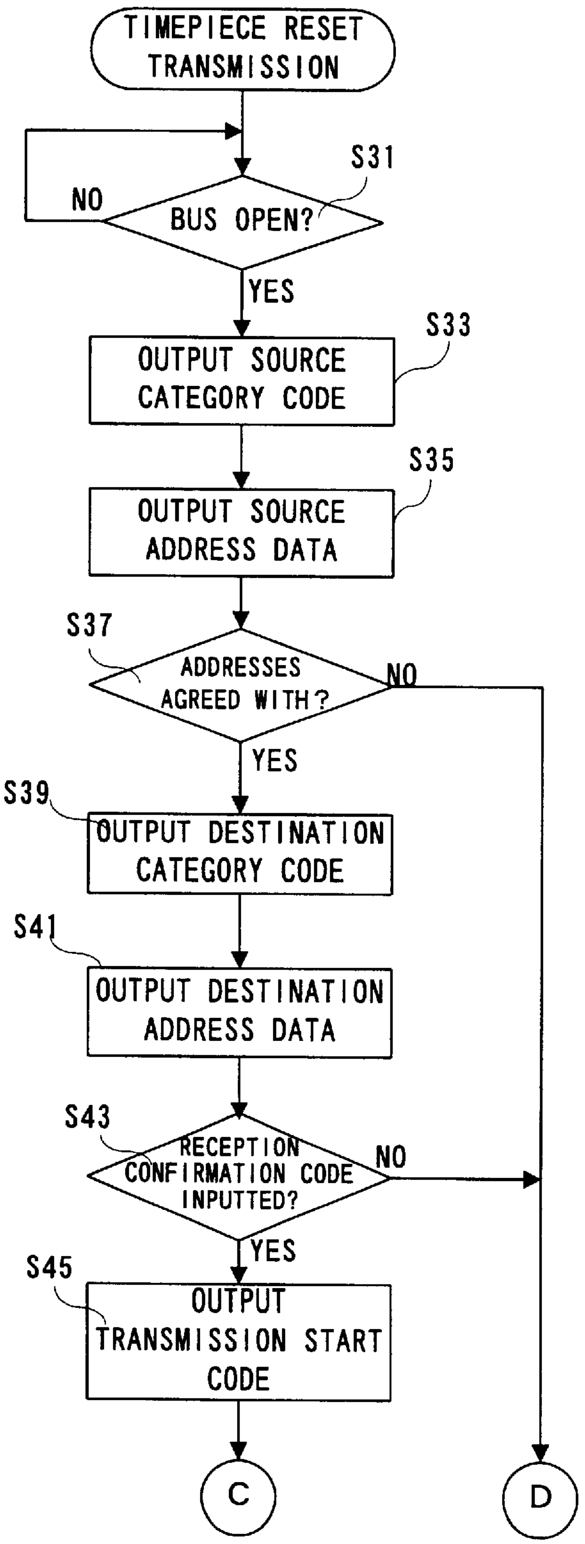
FIG. 6 is a flowchart showing another part of the operation of the remote control apparatus applied to the FIG. 1 embodiment.
Figure 7:
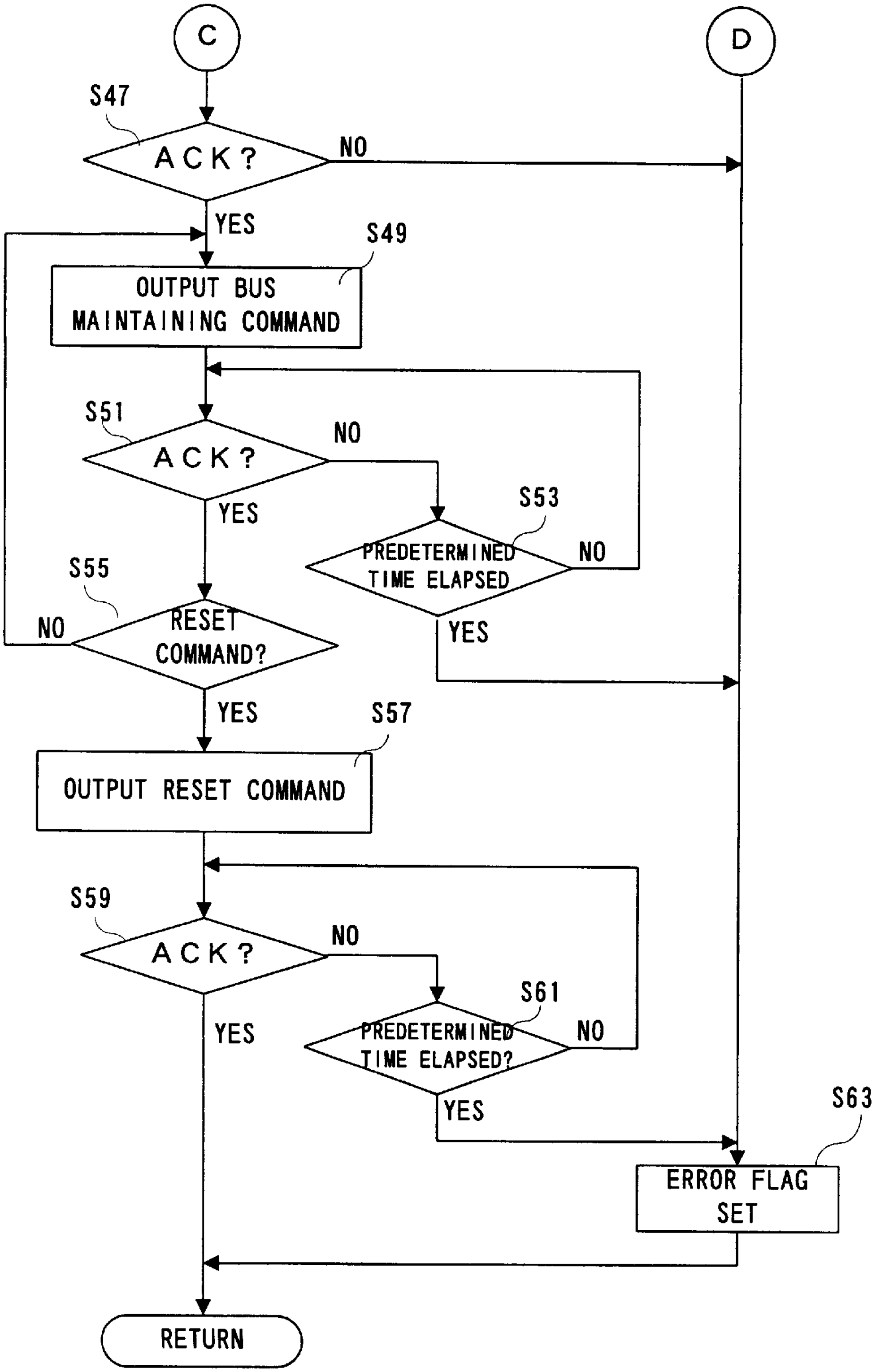
FIG. 7 is a flowchart showing another part of the operation of the remote control apparatus applied to the FIG. 1 embodiment.

If a timepiece reset mode is selected, the controller 12 processes a flowchart shown in FIG. 6 and FIG. 7 in response to operation of the SET key 12*j*. Note that in steps S31–S45 is performed a similar process to the steps S1–S15 and duplicated explanations are herein omitted.

Subsequent to step S45, the controller 12 determines in step S47 whether "ACK" has been inputted from a transmission destination or not. If no "ACK" has been inputted in a predetermined time, the process proceeds from step S47 to step S63 where an error flag 12*m* set process is made then returning to the main routine. On the other hand, if "ACK" has inputted in the predetermined time, the controller 12 advances to step S49 to output a bus maintaining command to the transmission destination. In the succeeding step S51, it is determined whether "ACK" has been inputted from the transmission destination or not. If "NO" here, it is determined in step S53 whether a predetermined time has elapsed or not. However, if "YES", it is determined in step S55 whether the RESET COMMAND key 12*d* has pressed or not. If "NO" in step S53, the process returns to step S51 while if "YES" the process advances to step S63. On the other hand, if "NO" in step S55, the process returns to step S49 while if "YES" the process advances to step S57.

Consequently, if "ACK" has not been sent back in a predetermined time from outputting a bus maintaining command, the process returns to the main routine through executing the error flag 12*m* set process. On the other hand, if "ACK" has been sent back in a predetermined time, determination is made on the presence or absence of an operation of the RESET COMMAND key 12*d*. If there is no operation, a bus maintaining command is again outputted. That is, bus maintaining commands are repeatedly outputted until operating the command key 12*d*, as long as no error occurs. If each appliance has not been inputted with a command over a predetermined time period, it cancels the protocol established state. In the timepiece reset transmission mode, bus maintaining commands are repeatedly outputted. Accordingly, the protocol established state is maintained between the controller 12 and the destination appliance even where the command key 12*d* is not operated.

If the command key 12*d* is operated, the controller 12 in step S57 outputs a reset command to the destination appliance and then in steps S59 and S61 performs a similar process to steps S51 and S53. That is, the process of step S59 is repeated before elapsing a predetermined time. If "ACK" is not sent back in the predetermined time, an error flag 12*m* set process is carried out in step S63 and the process returns to the main routine. On the other hand, if "ACK" is sent back in the predetermined time, "YES" is determined in step S59 and the process returns directly to the main routine.

Figure 8:
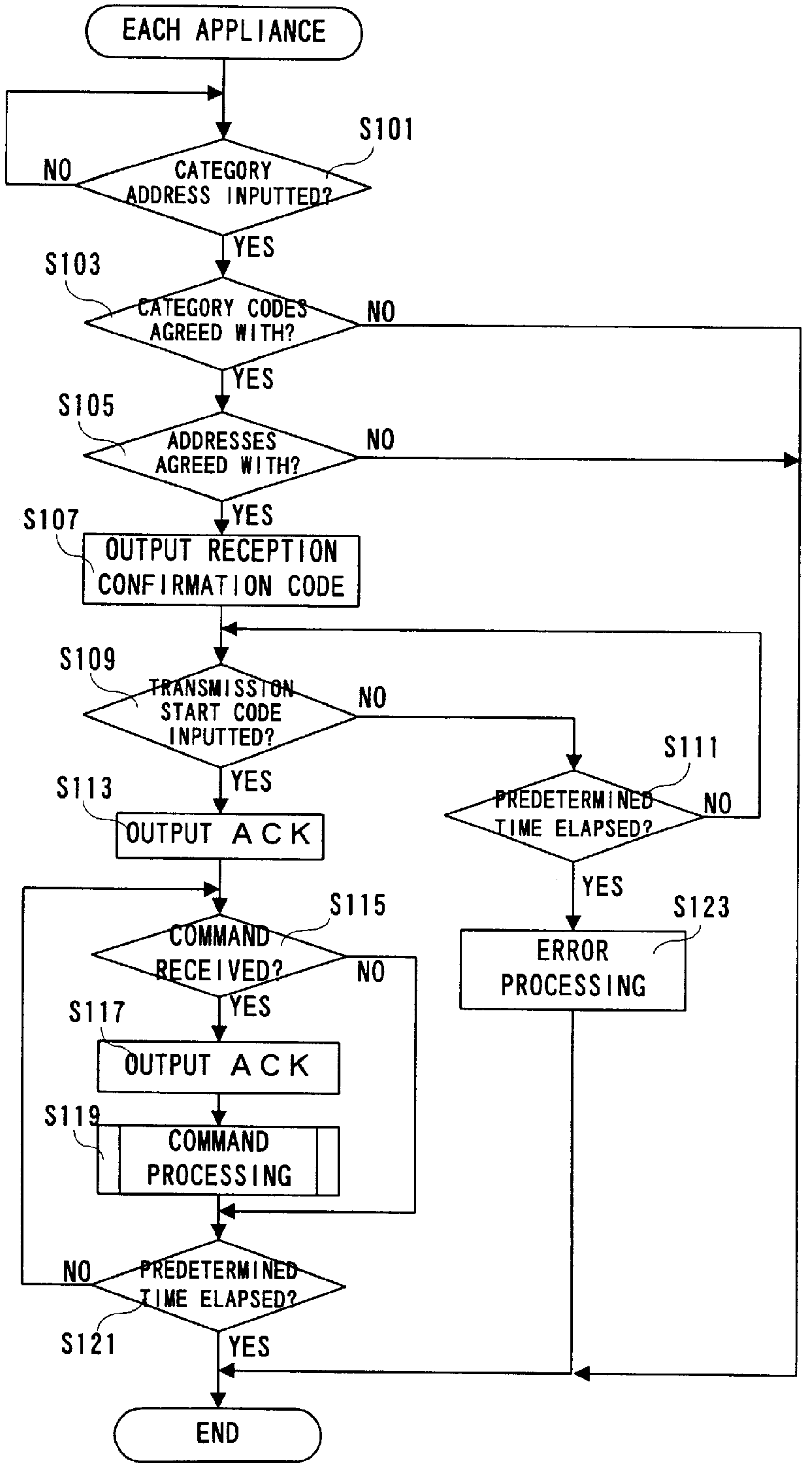
FIG. 8 is a flowchart showing part of operation of each electronic appliance applied to the FIG. 1 embodiment.

Each of the cameras 16*a*–16*m*, MPXs 18*a*–18*c* and VCRs 20*a*–20*c* processes a flowchart shown in FIG. 8. First, it is determined in step S101 whether a category code and address data have been inputted or not. If "YES", it is determined in step S103 whether the input category code agrees with an own category code or not. If "NO" here, the process is ended. However, if "YES", it is determined in step S105 whether the input address data agrees with an own address or not. If "NO" here, the process is ended similarly to the above. However, if "YES", it is determined that a protocol establishing instruction has been given, and in step S107 a reception confirmation code is outputted to the controller 12.

Subsequently, it is determined in step S109 whether a transmission start code has been inputted from the controller 12 or not. In step S111 is determined whether a predetermined time has elapsed or not. If no transmission start code has inputted in a predetermined time, the process is ended through executing an error process of step S123. On the other hand, if a transmission start code has inputted in a predetermined time, then in step S113 "ACK" is outputted to the controller 12, and it is determined in step S115 whether a command has received or not.

If receiving a command, in step S117 "ACK" is outputted to the controller 12 and in step S119 a reception command is processed. If the reception command is a timepiece reset command, a built-in timepiece circuit is reset. Meanwhile, if the received command is a bus maintaining command, the protocol established state is maintained. In the succeeding step S121, it is determined whether a predetermined time has elapsed or not. If "NO", the process returns to step S115 while if "YES" the process is ended. Due to this, as long as the commands are inputted with a shorter period than the predetermined time, the process of steps S115–S121 is repeated without ending the process. Incidentally, when "NO" is determined in step S115, the process proceeds to step S121 without executing the steps S117 and S119.

Figure 9:
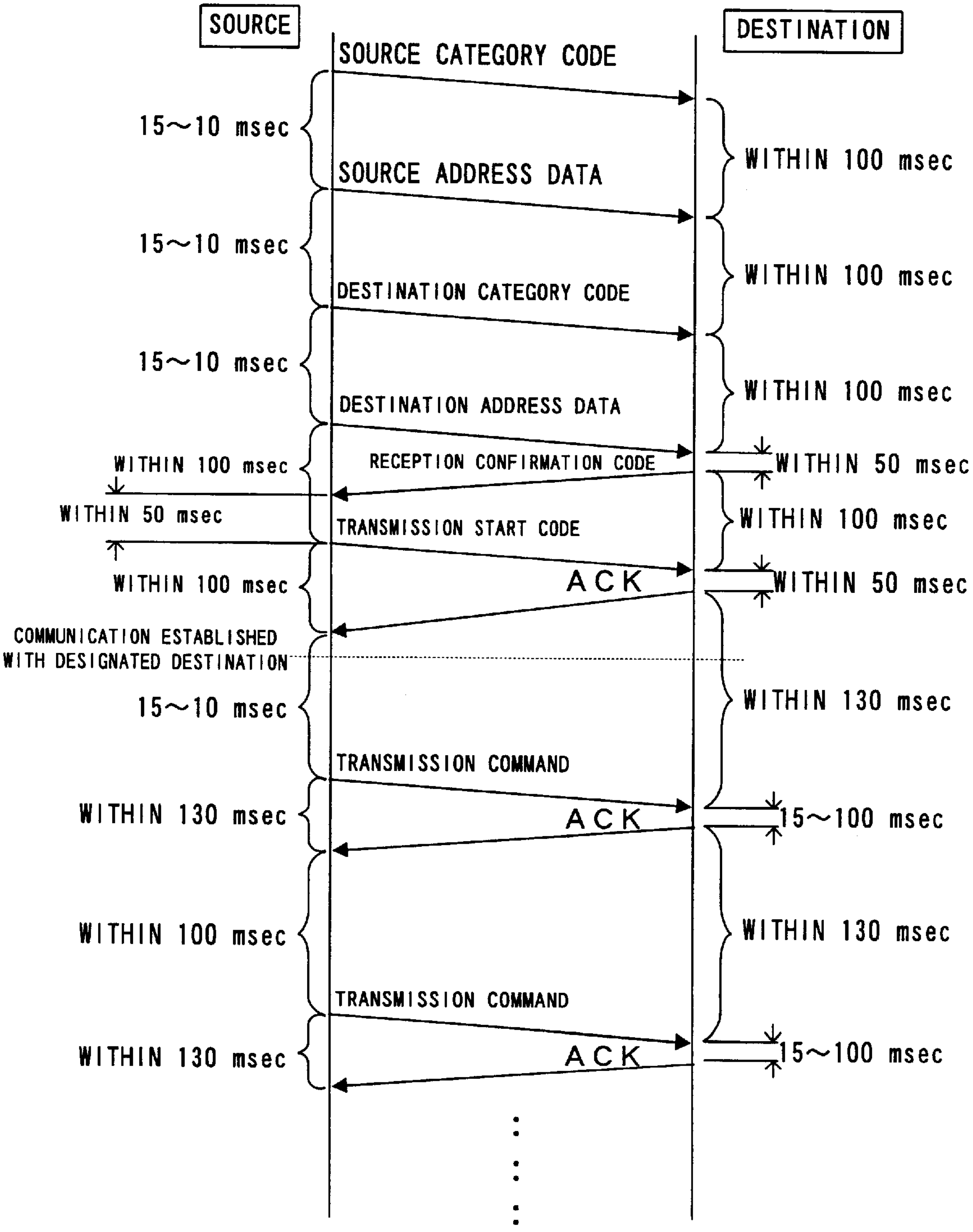
FIG. 9 is an illustrative view showing a communication protocol.

As can be understood from FIG. 9, before establishing a protocol, transmissions and receptions are made by a transmission source category code, transmission destination address data, transmission destination category code, transmission destination address data, reception confirmation code, transmission start code and "ACK". Due to this, it takes a time of approximately 500 milliseconds at maximum to establish a protocol. Because the command is first outputted after establishing a protocol, a time deviation of 500 milliseconds at maximum would occur between a time of inputting a command by an operator and a time of processing the command by the destination appliance. Accordingly, if the timepiece circuit is to be reset utilizing a normal transmission mode, a time delay of about 0.5 second will occur due to the above time flag.

In order to resolve such a problem, this embodiment is provided with a timepiece reset transmission mode. When this mode is selected, a protocol is established before activating a command key 12*d* operation wherein a protocol established state is maintained until operating the command key 12*d*. Due to this, the command key 12*d* is impossible to operate before establishing a protocol. However, once a protocol is established, a reset command is promptly outputted to the destination appliance in response to operation of the command key 12*d*. Consequently, the timepiece circuit is reset almost at the same time as an operation of the command key 12*d*.

Figure 10:
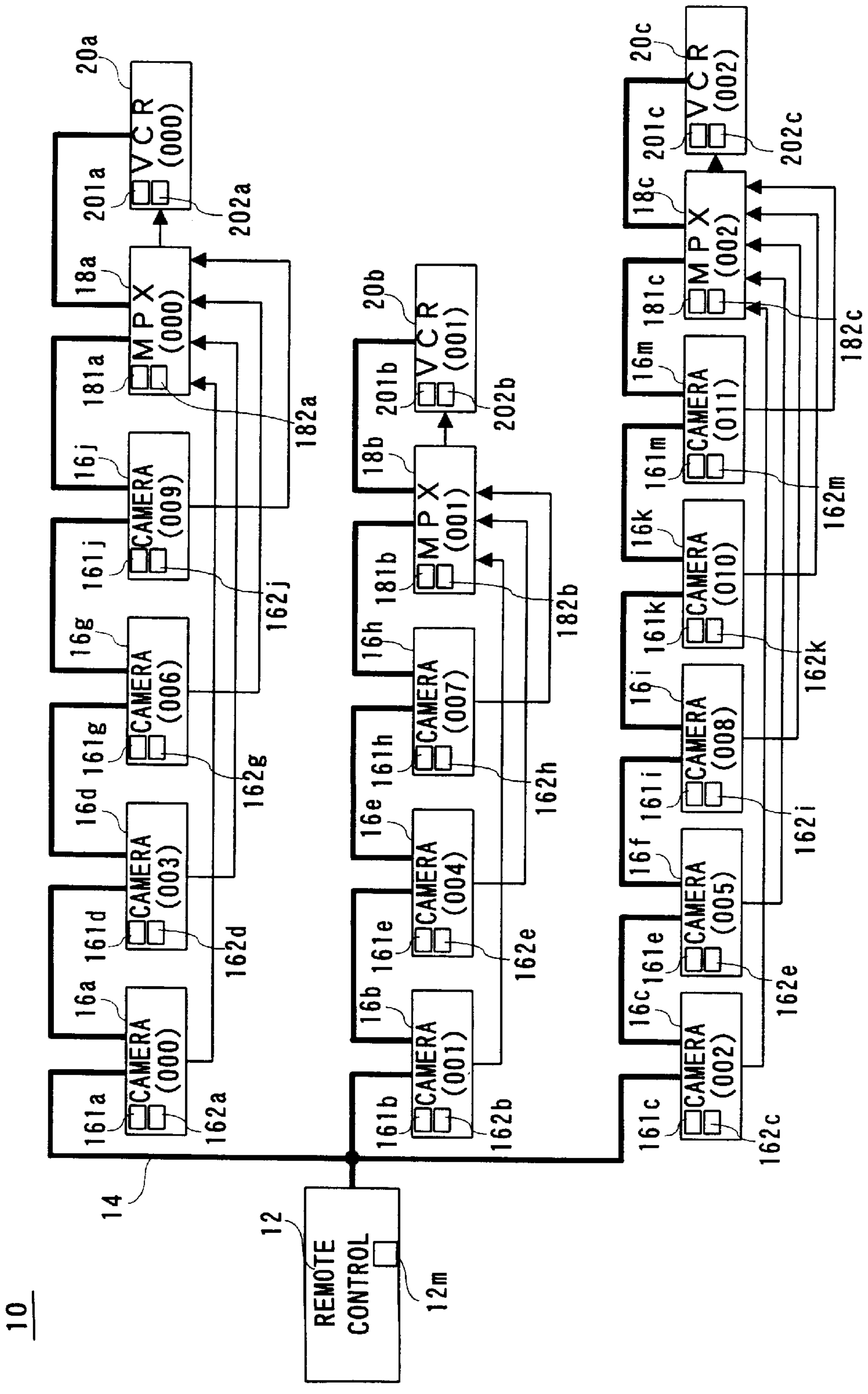
FIG. 10 is a block diagram showing another embodiment of the present invention.
Figure 11:
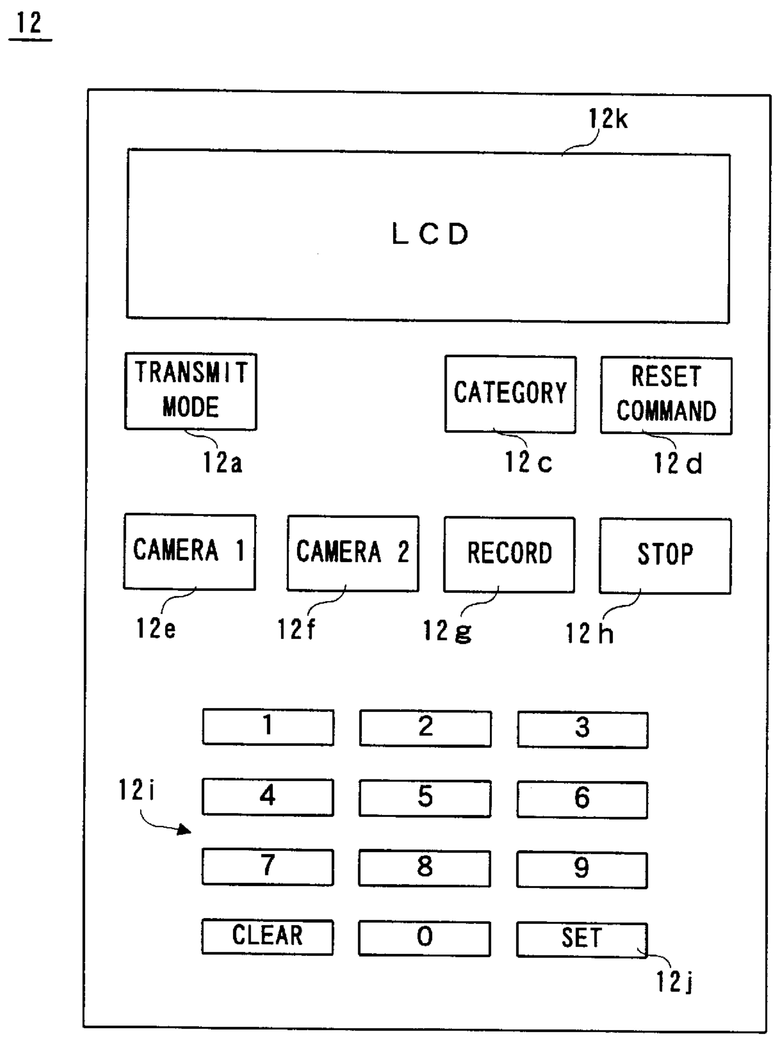
FIG. 11 is an illustrative view showing an operation panel of a remote control apparatus applied to the FIG. 10 embodiment.

Referring to FIG. 10, a monitor camera system 10 of another embodiment includes cameras 16*a*–16*m*, MPXs 18*a*–18*c* and VCRs 20*a*–20*c* as well as counters 162*a*–162*m*, 182*a*–182*c* and 202*a*–202*c* respectively provided therein. Meanwhile, the timepiece reset mode key 12*b* is omitted from the various keys 12*a*–12*j*, as will be understood from FIG. 11. Furthermore, when the normal transmission mode is selected, the controller 12 processes a flowchart shown in FIG. 12 and FIG. 13 in response to operation of any one of the command keys 12*d*–12*h*. Each of the cameras 16*a*–16*m*, MPXs 18*a*–18*c* and VCRs 20*a*–20*c* processes a flowchart shown in FIG. 14 and FIG. 15.

Figure 12:
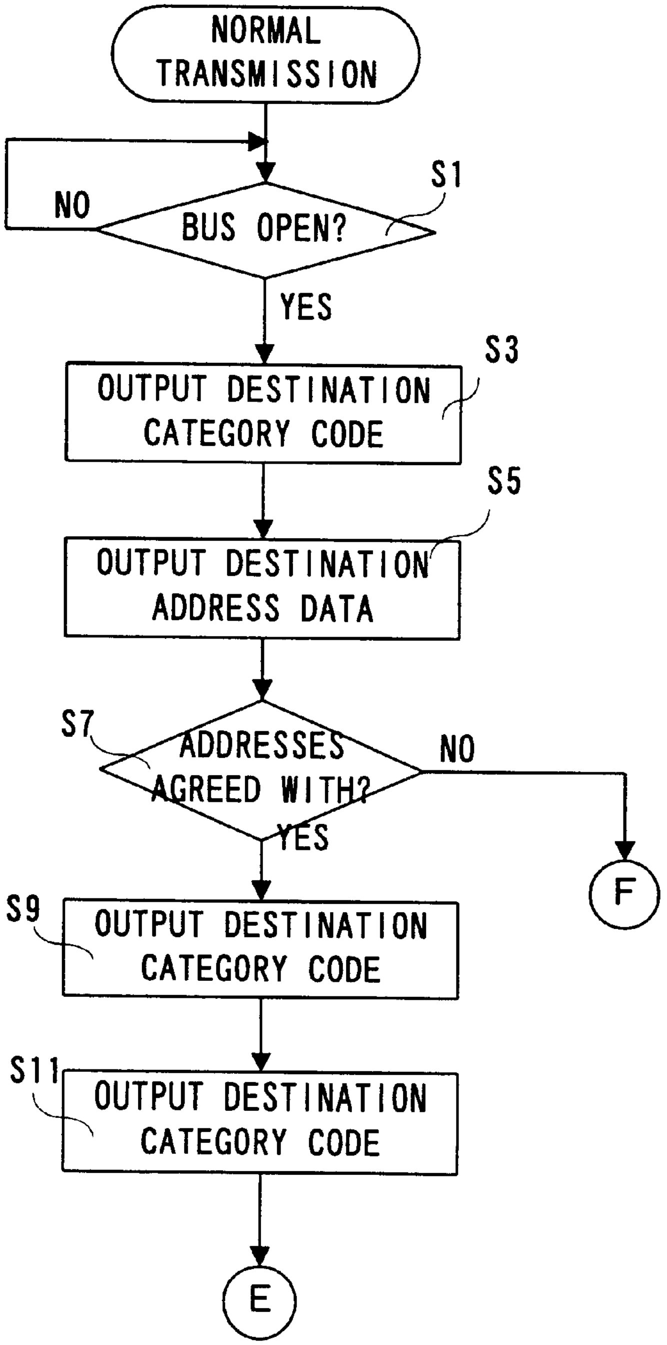
FIG. 12 is a flowchart showing part of operation of the remote control apparatus applied to the FIG. 10 embodiment.
Figure 13:
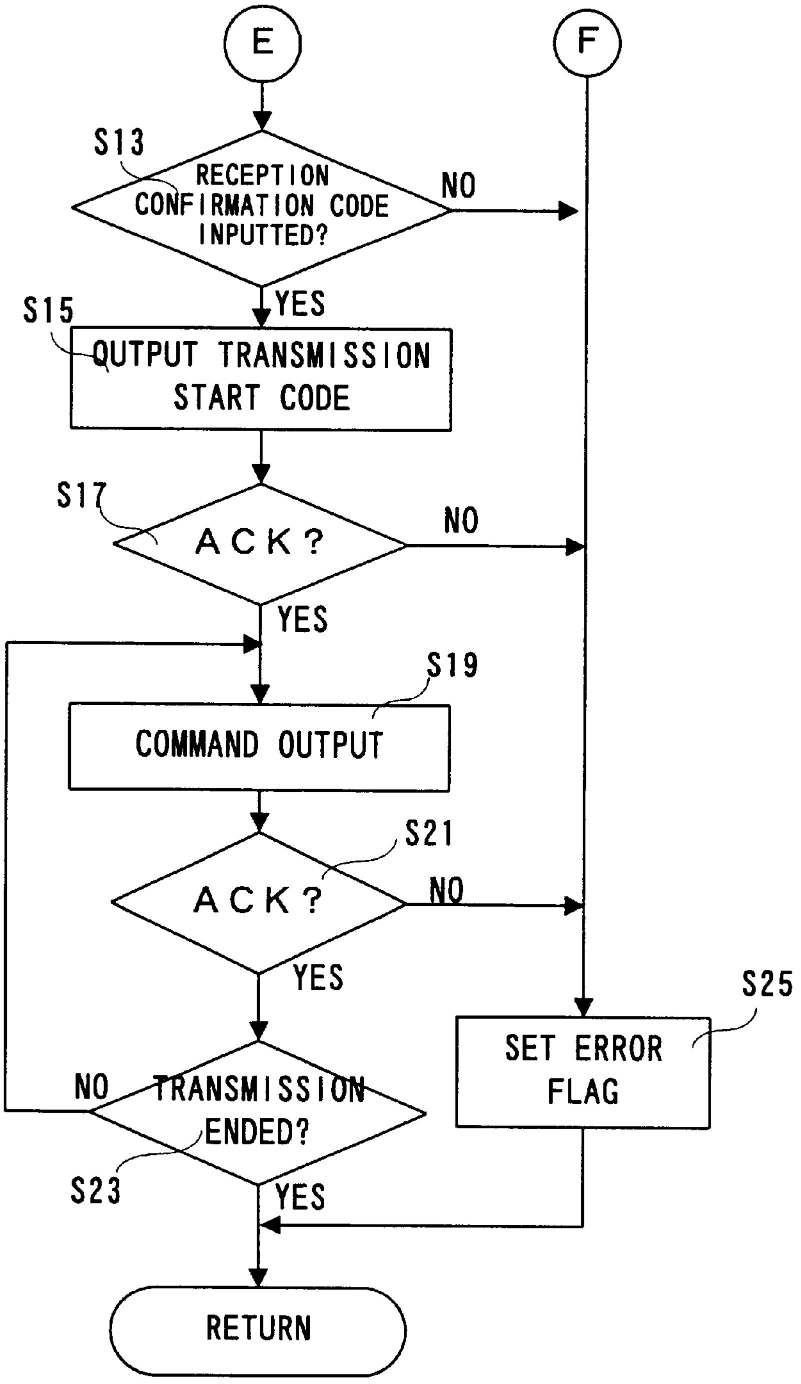
FIG. 13 is a flowchart showing another part of the operation of the remote control apparatus applied to the FIG. 10 embodiment.
Figure 14:
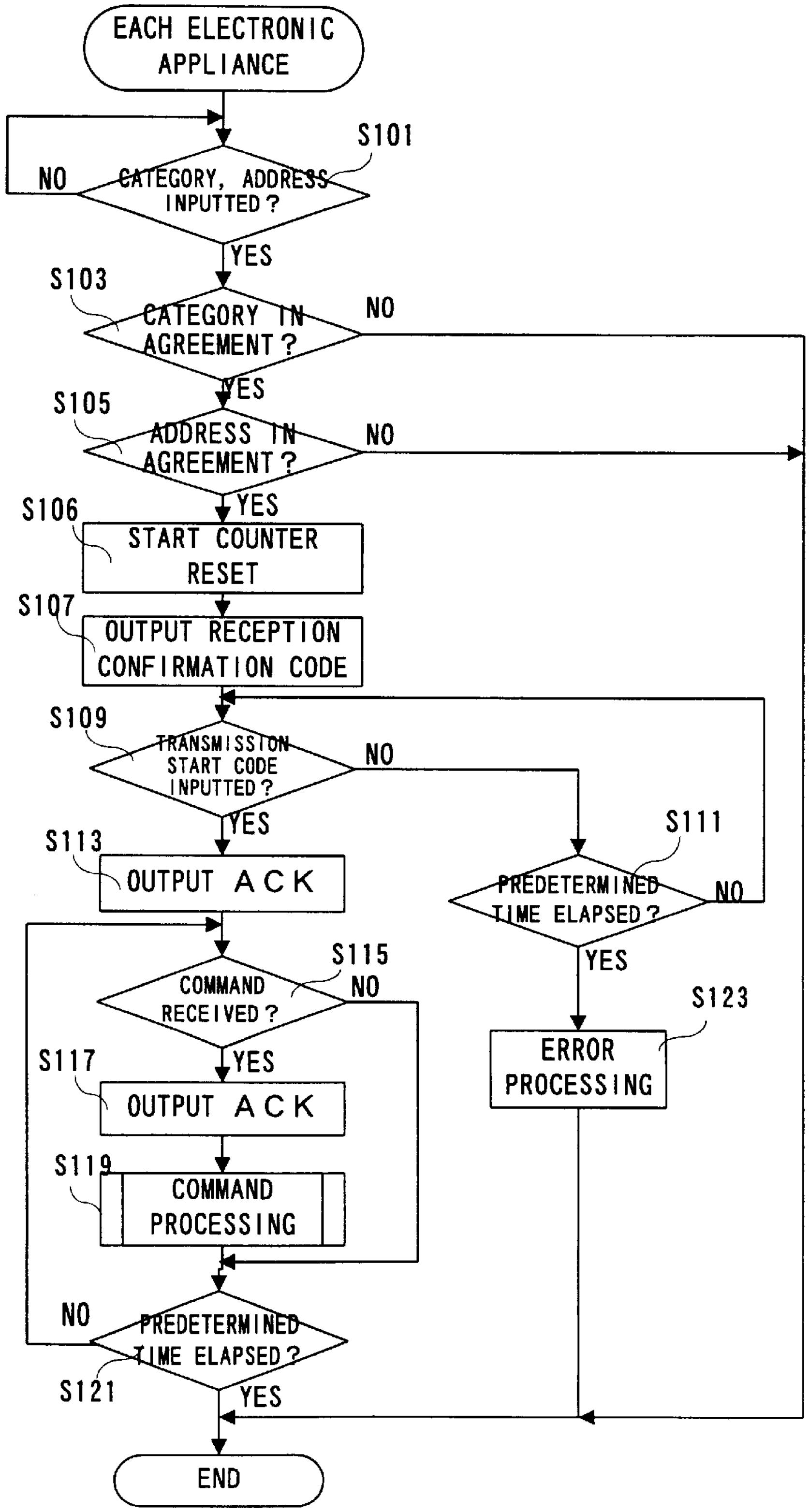
FIG. 14 is a flowchart showing part of operation of each electronic appliance applied to the FIG. 10 embodiment.

As stated above, no time reset mode key 12*b* is provided in this embodiment so that the controller 12 makes processing even for a time piece reset command, according to flowchart shown in FIG. 12 and FIG. 13. It however is noted that, because the flowchart of FIG. 12 and FIG. 13 has no difference from the flowchart of FIG. 4 and FIG. 5, it is impossible to eliminate a time deviation caused between a time of inputting a reset command and a time of resetting a timepiece by a same process in a destination appliance as that of the FIG. 1 embodiment. For this reason, this embodiment implements a different process from FIG. 8 (FIG. 14 and FIG. 15) in a destination appliance.

Specifically, when it is determined that addresses agree with each other, (a protocol establishing instruction is determined given) in step S105, the built-in counter in step S106 is reset and started. That is, the counter starts counting prior to a process of establishing a protocol. Note that FIG. 13 is same as the FIG. 8 flowchart except for a process of step S106.

Figure 15:
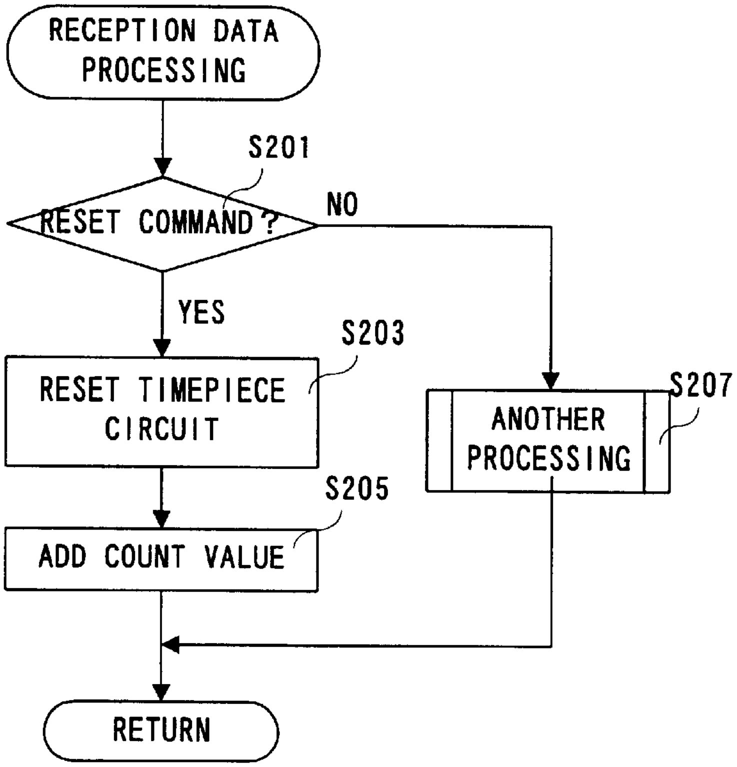
FIG. 15 is a flowchart showing another part of the operation of the electronic appliance applied to the FIG. 10 embodiment.

In step S119, a subroutine shown in FIG. 15 is processed. First, it is determined in step S201 whether a command given from the controller 12 is a reset command or not. If "NO" here, another process is performed in step S207 while if "YES" the timepiece circuit is reset in step S203 and in step S205 a current count value is added to a reset time. The counter value represents a time required to establish a protocol. The addition of this value to the reset time provides correction of a time presented by the timepiece circuit to an actual time. After ending the process of step S205 or S207, the process returns to the routine of FIG. 13.

According to this embodiment, measurement is made on a time period of from a start of a protocol establishing process to a reset command processing. Time correction is made by a measurement value. It is therefore possible to prevent, after resetting, a time presented by the timepiece circuit from being too late with respect to an actual time.

Figure 16:
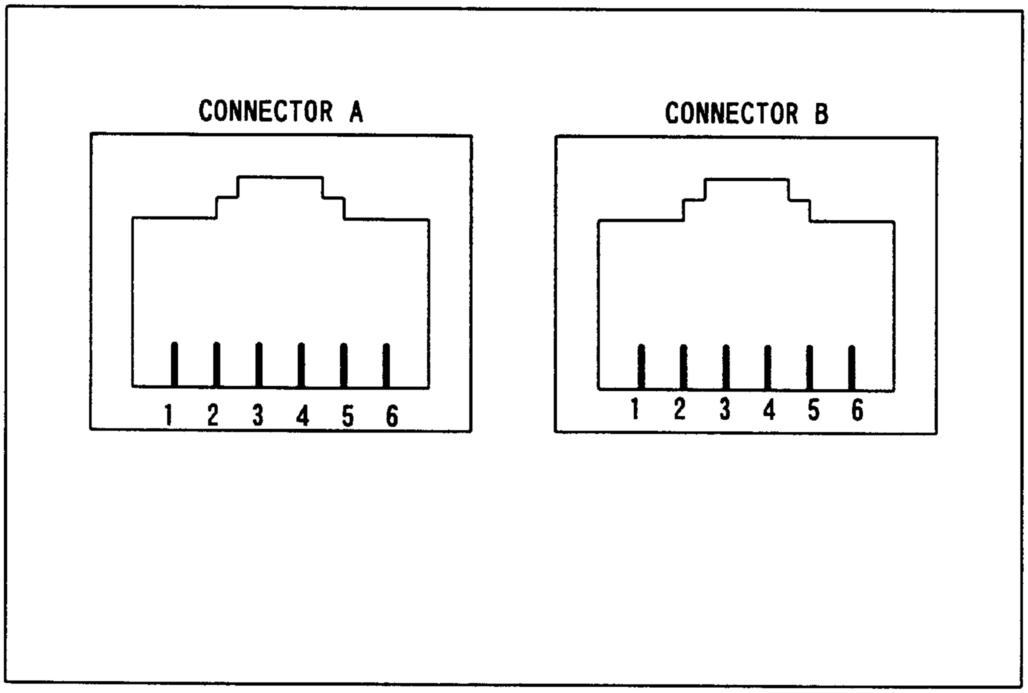
FIG. 16 is an illustrative view showing connectors provided on a back face of each electronic appliance.

Although FIG. 1 illustrated connections between the electronic appliances in a simple way, each electronic appliance has two connectors A and B (RJ-11) provided on a back face thereof as shown in FIG. 16. The bus 14 uses a cable RJ-11 having, at respective ends, RJ-11-schemed 6-pin plugs. The connectors A and B are fitted with such 6-pin plugs. The connectors A and B also are 6-pin connectors each assigned with first to sixth pins in an order of from left. It should be noted that, in balanced transmission according to the RS-485 rating, two signal lines and two pins connected to the two signal lines only are used for transmission and reception.

The pins actually used in balanced transmission are the third and fourth pins. Though the connector A third pin is inputted/outputted a signal, a same signal as which is inputted/outputted through the connector B fourth pin. Through the connector fourth pin is inputted/outputted a signal, a same signal as which is inputted/outputted through the connector B third pin. That is, the connector-A third pin and the connector-B fourth pin are used for transmission with the same signal while the connector-A fourth pin and the connector-B third pin are for transmission with the same signal.

The cables RJ-11 include two kinds, i.e. a straight type and a cross type. Where using a straight type cable in connection between two appliances, the first, second, third, fourth, fifth and sixth pins provided on one appliance are respectively connected to the first, second, third, fourth, fifth and sixth pins on the other appliance. In contrast to this, where a cross type table is employed in connection between two appliances, the first, second, third, fourth, fifth and sixth pins on one appliance respectively connected to the sixth, fifth, fourth, third, second and first pins on the other appliance.

Figure 17:
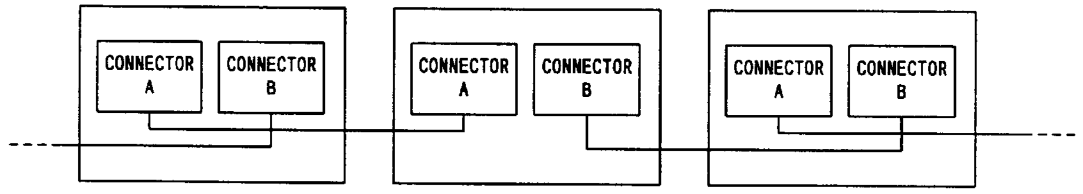
FIG. 17(A) is an illustrative view showing a state that electronic appliances are connected through straight-type cables RJ-11.
FIG. 17(B) is an illustrative view showing a state that electronic appliances are connected through cross type cables RJ-11.
Figure 17:
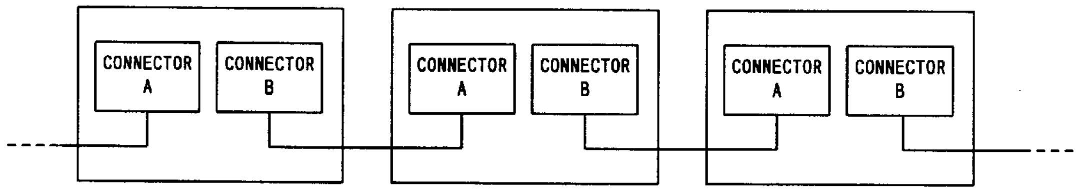

Consequently, where straight type tables only are available when actually setting up a monitor camera 10 of this embodiment, connections between the appliances may be made through connectors A or connectors B as shown in FIG. 17(A). By doing so, the third and fourth pins of a connector A provided on a certain appliance are connected to the third and fourth pins of a connector A on another appliance. Similarly, the third and fourth pins of a connector B on a certain appliance are also connected to the third and fourth pins of a connector B on another appliance. Thus, the appliances are put in proper connection.

On the contrary, when cross type cables only are available, connections between the appliances may made through connectors A and B as shown in FIG. 17(B). By doing so, the third and fourth pins of a connector A provided on a certain appliance are respectively connected to the fourth and third pins of a connector B on another appliance. The third and fourth pins of a connector B on a certain appliance are also connected to the fourth and third pins of a connector A on another appliance. In also this case, the appliances are put in proper connection.

In this manner, a same signal is assigned to a connector-A third pin and a connector-B fourth pin while a same signal is assigned to a connector-A fourth pin and a connector-B third pin. Due to this, the appliances can be properly connected through either one of the straight type and the cross type cables.

Incidentally, because the controller of the above embodiment controls the electronic appliances on a separate basis, the timepiece circuit reset process is implemented for each of the appliances. Alternatively, the timepiece circuit reset process may be carried out simultaneously by so-called broadcast transmission.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A remote control apparatus to remotely control a plurality of electronic appliances each of which has a timepiece circuit, comprising:

a first acceptor for accepting a selection of a desired electronic appliance among said plurality of electronic appliances;

a second acceptor for accepting a selection of a reset mode to perform a reset operation of the timepiece circuit;

an establisher for establishing a protocol with said desired electronic appliance in response to the selection of the reset mode;

a reset command transmitter for transmitting a reset command to said desired electronic appliance in response to the reset operation so as to request a reset of the timepiece circuit included in said desired electronic appliance; and a maintaining command transmitter for repeatedly transmitting a maintaining command to said desired electronic appliance so as to request a maintaining of the protocol for a time period from the establishing of the protocol to the reset operation.

2. A remote control apparatus according to claim 1, wherein said desired electronic appliance resets a time of the timepiece circuit in response to the reset command.

3. A remote control apparatus according to 1, wherein said electronic appliance cancels the protocol when a state of not given a command continues for a predetermined time period, and said maintaining command transmitter transmitting the maintaining command at a shorter interval than the predetermined time period and finishing a transmitting operation of the maintaining command in response to the reset operation.

4. A remote control method to remotely control a plurality of electronic appliances each of which has a timepiece circuit, comprising the steps of:

(a) accepting a selection of a desired electronic appliance from among said plurality of electronic appliances;

(b) accepting a selection of a reset mode to perform a reset operation of the timepiece circuit;

(c) establishing a protocol with said desired electronic appliance in response to the selection of the reset mode;

(d) transmitting a reset command to said desired electronic appliance in response to the reset operation so as to request a reset of the timepiece circuit included in said desired electronic appliance; and (e) repeatedly transmitting maintaining command to said desired electronic appliance so as to request a maintaining of the protocol for a time period from the establishing of the protocol to the reset operation.

* * * * *